(12) United States Patent
Hwang et al.

(10) Patent No.: US 11,306,017 B2
(45) Date of Patent: Apr. 19, 2022

(54) MOLD SUPPORTING DEVICE FOR FORMING UNIFORM MOLTEN SOLIDIFIED BODY, AND METHOD FOR FORMING UNIFORM MOLTEN SOLIDIFIED BODY

(71) Applicant: KOREA HYDRO & NUCLEAR POWER CO., LTD, Gyeongsangbuk-do (KR)

(72) Inventors: Young Hwan Hwang, Daejeon (KR); Seok Ju Hwang, Daejeon (KR); Cheon Woo Kim, Daejeon (KR)

(73) Assignee: Korea Hydro & Nuclear Power Co.; LTD, Gyeongsangbuk-do (KR)

( * ) Notice: Subject to any disclaimer, the term of this patent is extended or adjusted under 35 U.S.C. 154(b) by 418 days.

(21) Appl. No.: 16/462,177

(22) PCT Filed: Nov. 20, 2017

(86) PCT No.: PCT/KR2017/013172
§ 371 (c)(1),
(2) Date: May 17, 2019

(87) PCT Pub. No.: WO2018/097552
PCT Pub. Date: May 31, 2018

(65) Prior Publication Data
US 2019/0330095 A1    Oct. 31, 2019

(30) Foreign Application Priority Data
Nov. 25, 2016 (KR) .......... 10-2016-0158327

(51) Int. Cl.
*C03B 19/02* (2006.01)
*F27D 3/14* (2006.01)
*F27D 15/00* (2006.01)

(52) U.S. Cl.
CPC ............. *C03B 19/02* (2013.01); *F27D 3/14* (2013.01); *F27D 15/00* (2013.01)

(58) Field of Classification Search
CPC ............ C03B 19/02; F27D 15/00; F27D 3/14
(Continued)

(56) References Cited

U.S. PATENT DOCUMENTS 3,166,803 A * 1/1965 Ruckstuhl ............ B22D 11/041
164/416
3,307,230 A * 3/1967 Goss .................... B22D 11/053
164/449.1
(Continued)

FOREIGN PATENT DOCUMENTS

CN    102471126 A    5/2012
CN    203284313 U    11/2013
(Continued)

OTHER PUBLICATIONS

Japanese Notice of Allowance dated Apr. 26, 2021 in JP Application No. 2019-547059.
(Continued)

*Primary Examiner* — Scott R Kastler
*Assistant Examiner* — Michael Aboagye
(74) *Attorney, Agent, or Firm* — Occhiuti & Rohlicek LLP

(57) ABSTRACT

A device for forming a molten solidified body by receiving a molten material discharged from a vitrification device or the like on a lower mold, and a method for forming a molten solidified body and, particularly, to a mold supporting device for forming a uniform molten solidified body such that a height deviation on a mold of a dropping molten material is reduced by providing movement to the mold, and a method for forming an uniform molten solidified body. The mold supporting device and the method for forming a uniform
(Continued)

molten solidified body to prevent the formation of a high columnar shape at a specific position by the molten effluent not being uniformly contained in the mold due to the high viscosity thereof, thereby forming a uniform solidified body.

8 Claims, 4 Drawing Sheets

(58) Field of Classification Search
USPC ....... 65/29.17, 404, 264, 266, 302, 290, 259
See application file for complete search history.

(56) References Cited

U.S. PATENT DOCUMENTS

| | | | | |
|---|---|---|---|---|
| 4,304,287 | A | * 12/1981 | Lavanchy | ............... G05D 9/12 |
| | | | | 164/4.1 |
| 5,526,870 | A | * 6/1996 | Odegard | ............. B22D 11/181 |
| | | | | 164/449.1 |
| 6,415,630 | B1 | 7/2002 | Coriand et al. | |
| 8,733,424 | B1 | * 5/2014 | Watts | .................. B22D 13/107 |
| | | | | 164/457 |
| 2012/0131954 | A1 | 5/2012 | Sudo et al. | |
| 2015/0307385 | A1 | 10/2015 | Klein et al. | |

FOREIGN PATENT DOCUMENTS

| | | | | |
|---|---|---|---|---|
| CN | 205387540 | | 7/2016 | |
| JP | S58190827 | * | 11/1983 | ............. C03B 19/02 |
| JP | S58190827 | A | 11/1983 | |
| JP | H0692657 | A | 4/1994 | |
| JP | 09263414 | | 9/1997 | |
| JP | 11512381 | | 10/1999 | |
| JP | 2000007360 | | 1/2000 | |
| JP | 2000-230999 | A | 8/2000 | |
| JP | 2001-524920 | A | 12/2001 | |
| JP | 2002037637 | | 2/2002 | |
| JP | 2002-541329 | A | 12/2002 | |
| KR | 1020120032028 | | 4/2012 | |
| WO | 9710183 | | 3/1997 | |
| WO | 00/61823 | A1 | 10/2000 | |

OTHER PUBLICATIONS

Japanese Office Action dated Jun. 8, 2020 in JP Application No. 2019-547059.
Japanese Office Action dated Jan. 12, 2021 in JP Application No. 2019-547059.
Korean Notice of Allowance, Application No. KR 10-2016-0158327, dated Aug. 7, 2018, 2 pages.

* cited by examiner

MOLD SUPPORTING DEVICE FOR FORMING UNIFORM MOLTEN SOLIDIFIED BODY, AND METHOD FOR FORMING UNIFORM MOLTEN SOLIDIFIED BODY

This application is a National Phase under 35 U.S.C. 371 of International Application No. PCT/KR2017/013172 filed on Nov. 20, 2017, which claims priority to Korean Application No. 10-2016-0158327 filed on Nov. 25, 2016.

TECHNICAL FIELD

The present invention relates to a device for forming a molten solidified body by receiving a molten material discharged from a vitrification device or the like on a lower mold, and a method for forming a molten solidified body and, particularly, to a mold supporting device for forming a uniform molten solidified body such that a height deviation on a mold of a dropping molten material is reduced by providing movement to the mold.

BACKGROUND ART

A conventional general method of forming a molten solidified body is shown in FIG. 1. In general, in a melting furnace 10 of vitrification equipment, a molten material 20 is formed using induction heating, plasma torch heating, etc., and the thus-formed molten material 20 is discharged by opening the outlet at a lower part of the melting furnace, and the molten material 20 being discharged is contained in a molten material mold 30 at a lower part thereof.

However, when the composition of a molten material of the vitrification equipment has a high viscosity, there was a problem at the time of discharging in that the molten material cannot spread uniformly in a mold and concentrate around the area where the molten material drops thereby forming a columnar shape at the center of the mold. When a molten material is locally concentrated to form a columnar shape as such, there was a problem in that the efficient emission could not be achieved, for example, the emission of the mold could not be met and thus the emission had to be stopped without filling up a suitable amount of discharge, etc.

DISCLOSURE

Technical Problem

An object of the present invention is to carry out the discharging of a mold in an efficient manner by preventing the formation of a non-uniform molten solidified body at a specific position caused by a high viscosity of a molten effluent when the molten effluent is to be contained in the mold at a lower part of a melting furnace in an existing vitrification equipment.

Technical Solution

The above object of the present invention can be achieved by a mold supporting device for forming a molten solidified body, which includes: a molten solidified body mold, which receives a molten effluent at a lower part of a melt discharge outlet of a melting furnace and forms a solidified body; a horizontal mold movement part, which, when the molten effluent is discharged, allows a horizontal positional shift such that the position onto which the molten effluent drops varies; and a mold supporting part, which supports the molten solidified body mold from the lower part.

The mold supporting device may further include a vertical mold movement part that vertically moves the molten solidified body mold.

The horizontal mold movement part may further include an X axis movement part and a Y axis movement part.

The mold supporting device may further include a rotational movement part that rotates the molten solidified body mold.

The mold supporting device may include a mold movement control part that controls the movement of the horizontal mold movement part such that the height of the molten effluent of the melting furnace becomes uniform.

To achieve the above object, the present invention also provides a method for forming a molten solidified body, which includes: a step of disposing a mold, in which a molten solidified body mold is disposed at a first position for receiving a discharge; a step of discharging a molten material, in which a molten material is discharged from a melting furnace after the step of disposing a mold; and a step of mold movement, in which a movement is provided to the molten solidified body mold such that the position of the molten solidified body mold onto which the molten material being discharged from the melting furnace drops varies.

The step of mold movement may include a step of movement such that the position of the molten solidified body mold onto which the molten material drops moves in a zigzag pattern.

The step of mold movement may include a step of movement such that the position of the molten solidified body mold onto which the molten material drops moves in a spiral pattern.

The step of disposing a mold may be performed such that the position of the molten solidified body mold onto which the molten material drops becomes a central part of the molten solidified body mold.

The step of disposing a mold may be performed such that the position of the molten solidified body mold onto which the molten material drops becomes one side of the inside of the molten solidified body mold.

The step of mold movement may further include a step of vertically moving the molten solidified body mold.

The step of mold movement may further include a step of vibratorily moving the molten solidified body mold.

The method for forming a molten solidified body may further include a step of measuring the height of the molten material in which at least two heights of the molten material within the molten solidified body mold are measured, after the step of discharging a molten material.

The method for forming a molten solidified body may further include a step of moving the position onto which a molten material drops to the lowest position among the measured heights of the molten material, after the step of measuring the height of the molten material.

Advantageous Effects

The mold supporting device of the present invention has an advantage in that it can effectively discharge a molten material by making the height of the solidified solid in the mold uniform by transporting the mold position such that the position of a mold onto which a molten material drops varies while the molten material is being discharged.

MODE FOR INVENTION

Reference will now be made in detail to the preferred embodiments of the present invention, examples of which are illustrated in the accompanying drawings.

The detailed description set forth below in connection with the appended drawings is a description of exemplary embodiments and the spirit of the present invention is not limited to the accompanying drawings.

Figure 1:
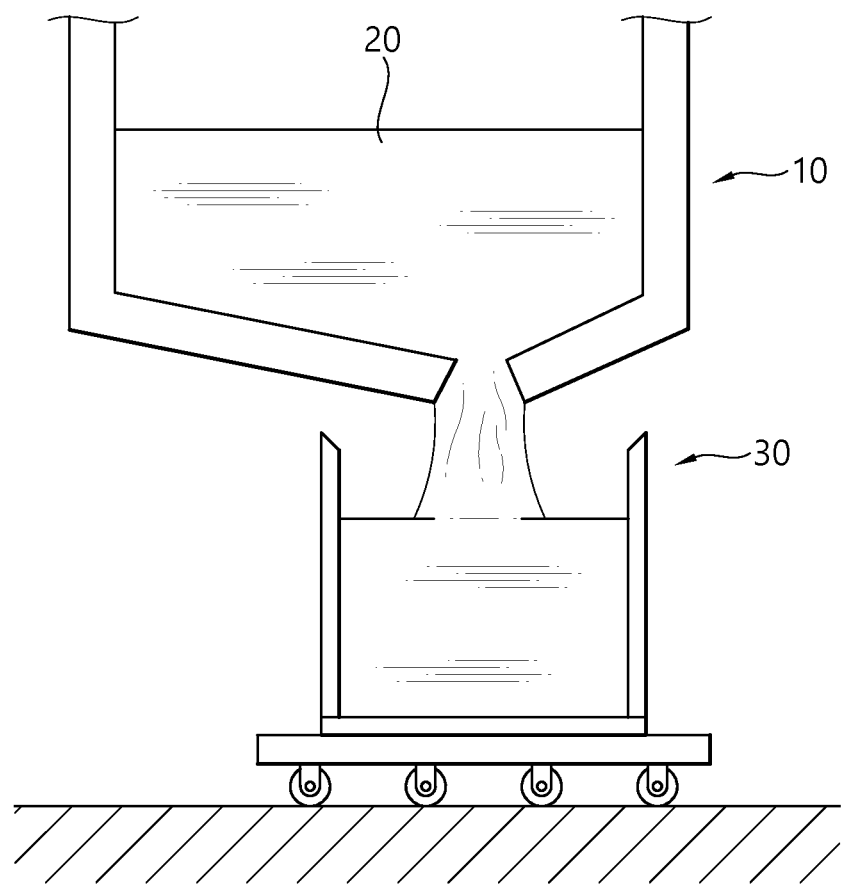
FIG. 1 is a cross-sectional view of a conventional molten material mold.
Figure 2:
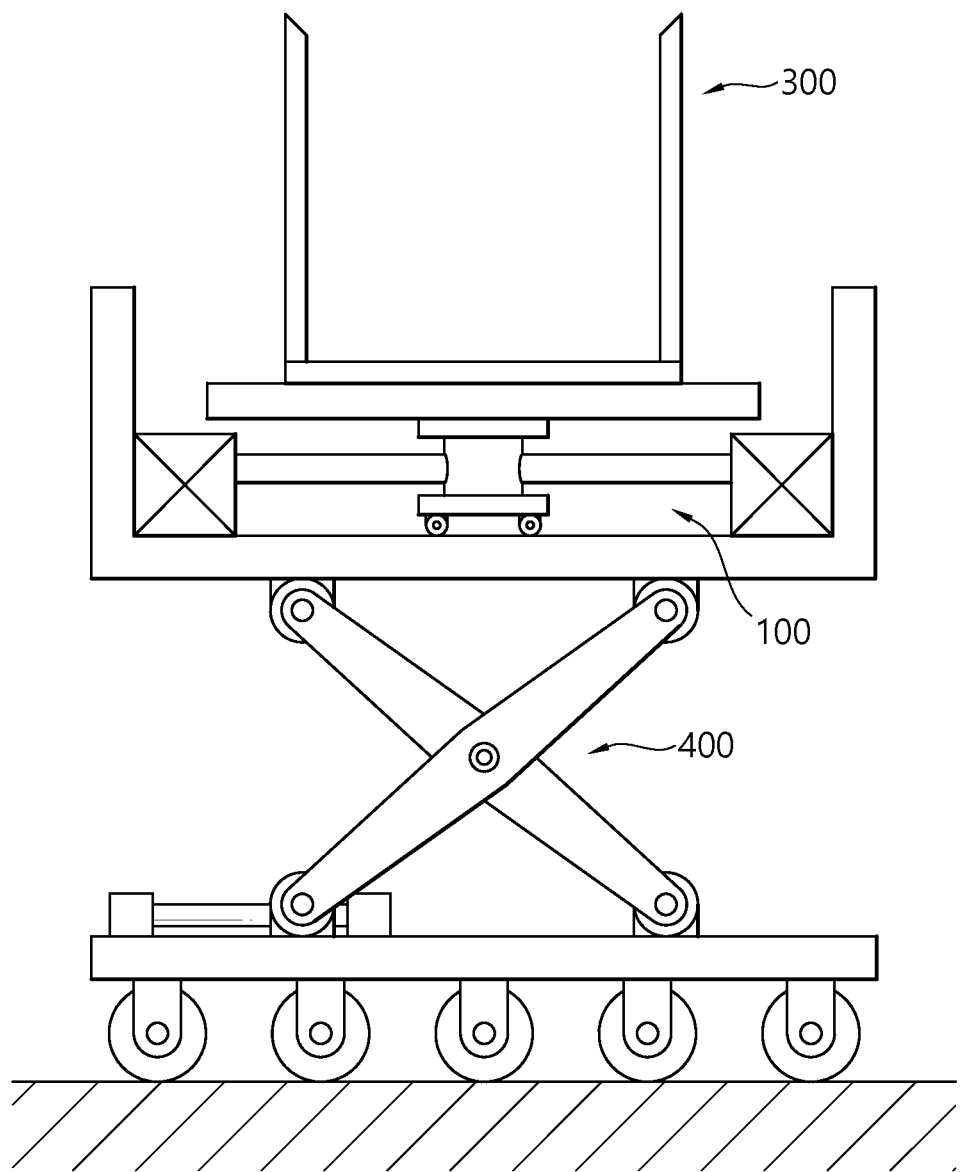
FIG. 2 is a cross-sectional view of a mold supporting device according to an embodiment of the present invention.

FIG. 2 is a schematic view illustrating a mold supporting device for forming a molten solidified body in the present invention. A molten solidified body mold 300 for forming a solidified body by receiving a molten effluent from a melting furnace is disposed on an upper part. The molten solidified body mold 300 is a mold for receiving a general molten material and there is no particular limitation on the material or shape thereof, however, a general cylindrical mold which is advantageous for forming a uniform solid body is preferred.

A horizontal mold movement part 100 for providing the mold with a horizontal movement within a certain range is disposed on a lower part of the molten solidified body mold 300. The horizontal mold movement part 100 can employ a hydraulic cylinder moving in the X and Y axes. In particular, when an X axis movement part and a Y axis movement part are moved by combination, the position of the molten solidified body mold 300 can be altered freely within a predetermined range on a plane. The horizontal mold movement part 100 may also be a transport device having one or more wheels. An electric motor may be used to provide the molten solidified body mold 300 with a movement within a certain range like a bumper car, using an electric motor, etc.

In addition, the mold supporting device of the present invention may further include a vertical mold movement part 400. The vertical mold movement part 400 not only provides a molten solidified body 300 with a role of controlling the height of the mold at the beginning and end of discharging the molten material to the mold 300, but also adds a vertical movement of the mold in addition to the horizontal movement when necessary, thereby enabling a three-dimensional movement and assisting a uniform discharge of a molten material into the mold. In the present invention, the uniformity means that the molten solidified body being discharged and formed on the mold has a small deviation of height at the upper part thereof, thus forming a constant height without a distinctive bulge.

The mold supporting device of the present invention may further include a rotational movement part for rotating the molten solidified body mold 300 (not shown). In particular, when the central axis of the rotational movement part is made to be eccentric from the center of the mold, it is possible to allow a change in the position to drop on the mold to some extent even by the rotational movement alone.

A mold movement control part is required to change the position of the molten solidified body mold 300 using the horizontal mold movement part 100. The mold movement control part may be controlled according to a program for altering the position of the mold periodically or aperiodically. The mold movement control part may be a simple operation unit manually changed by an operator, but it is preferred that the mold movement control part be automatically controlled to enable the formation of a molten solidified body for effective discharge.

In the present invention, a method of forming a molten solidified body using the mold supporting apparatus includes the following steps a) a step of disposing a mold, in which a molten solidified body mold is located at a first position for receiving a discharge; b) a step of discharging a molten material, in which a molten material is discharged from a melting furnace after the step of disposing a mold; and c) a step of mold movement, in which the molten solidified body mold is provided with a movement such that the position of the molten solidified body mold onto which the molten material being discharged from the melting furnace drops varies.

In the present invention, the molten solidified body mold to receive a molten material from a melting furnace so as to form a molten solidified body is disposed at an appropriate position of a lower end of the molten material discharge outlet of the melting furnace before discharge. In particular, conventionally, while the position onto which a molten material drops is generally disposed to be located at the center of the mold, in the present invention, it does not matter whether the position onto which a molten material drops is located at the center of a mold or at a side portion thereof as long as the position is located inside of the mold. However, in consideration of the situation where the emission is abnormally splashed at the initial stage of the discharge, etc., it is preferred that the position be adjusted to be located at the center.

Figure 3A:
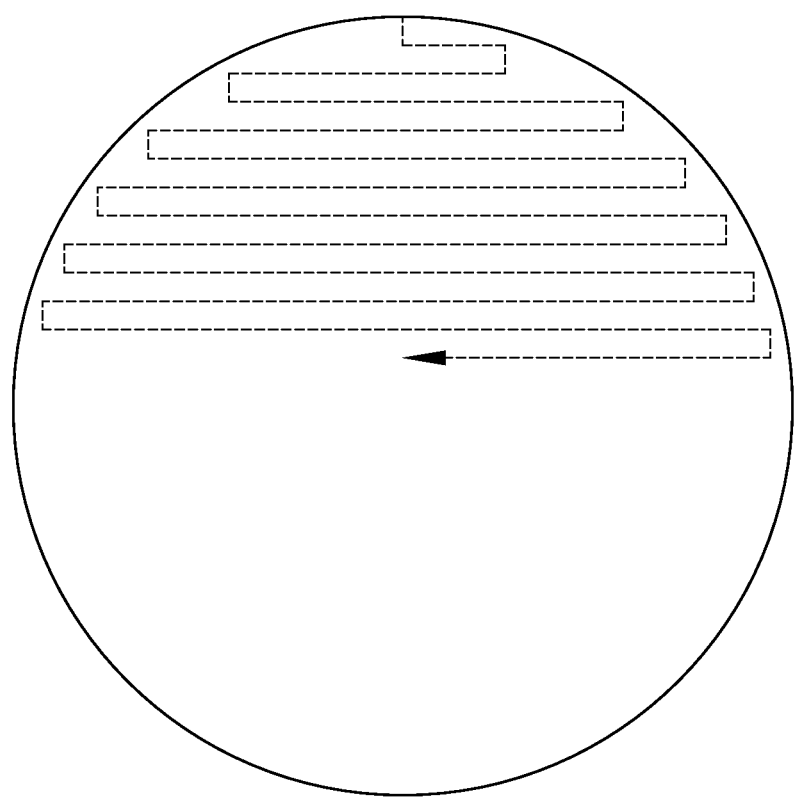
FIG. 3a is a schematic diagram illustrating a method of transporting a mold according to an embodiment of the present invention.
Figure 3B:
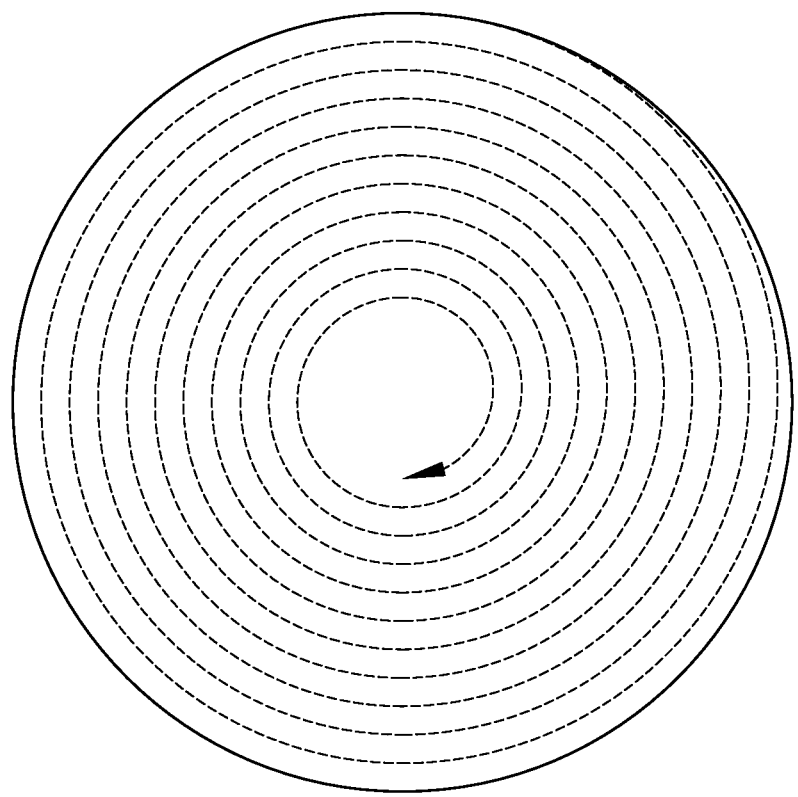
FIG. 3b is a schematic diagram illustrating a method of transporting a mold according to another embodiment of the present invention.

When the position of the mold is disposed in an appropriate position, the discharge of a molten material begins. During the discharge, the position of the mold onto which the molten material drops is altered. Basically, the position of the mold onto which the molten material drops is preferred to be disposed on a side where the height of the molten material on the molten solidified body mold is lower. The alteration in the position of the mold for the formation of a molten solidified body may be programmed in various forms. FIGS. 3a and 3b show schematic diagrams illustrating the regular alteration of the position onto which the molten material drops. The position may be altered in a zigzag pattern as illustrated in FIG. 3a and in a spiral pattern as illustrated in FIG. 3b, and may also be programmed to alter the position randomly. However, it is desirable to minimize the position shift so as to achieve both objects from the aspects of energy efficiency and formation of a uniform solidified body.

In addition to the horizontal movement, a vertical movement may be further added to the molten solidified body mold during the discharge, and this is expected to have an effect of reducing the non-uniformity in discharge by keeping the position for dropping constant. Furthermore, a molten solidified body may be provided with vibration to give a molten material a uniform.

In addition to the regular positional alterations above, a method may be considered, in which the height of a molten material discharged on the molten solidified body mold 300 is measured, and based on the same, a molten solidified body mold 300 is adjusted such that the position onto which the molten material drops is located at a lower height of the molten material. The height must be measured at two or more positions for comparison purposes, and preferably at three or more positions. The number of positions for measurement is determined in consideration of the size of the mold, viscosity of a molten material, etc. It is desirable to move the position for dropping to a position with the lowest height of the molten material among the measured positions for forming a uniform molten solidified body. In a case where there are a large number of measurement positions available, the movement route may be controlled so as to avoid the highest position, that is, the position with the highest height of the molten material cannot be assigned as the position for dropping.

As described above, when a solidified body is formed by altering the position of a molten solidified body mold using the mold supporting device or the method for forming a molten solidified body of the present invention, the molten solidified body is formed only in a part of the mold. Therefore, it is possible to solve the problem in that the discharge amount of the molten solidified body is less than the appropriate amount of the mold and can utilize the mold capacity as much as possible, thereby effectively performing the discharge of the molten material in the vitrification equipment.

The above embodiments are provided for the illustration of the present invention and the scope of the present invention is not limited to these embodiments. It will be apparent to those skilled in the art that various changes can be made therein without departing from the spirit and thus the technical scope of the present invention should be determined by the appended claims.

The invention claimed is:

1. A mold supporting device for forming a molten solidified body, comprising:
   a molten solidified body mold, which receives a molten effluent at a lower part of a melt discharge outlet of a melting furnace and forms a solidified body;
   a horizontal mold movement part for providing the mold with horizontal movement within a certain range, the horizontal mold movement part being disposed on a lower part of the molten solidified body mold and comprising an X axis movement part and a Y axis movement part that are moved in combination so that a position of the molten solidified body mold is altered freely within a predetermined range on a horizontal plane, wherein, when the molten effluent is discharged, the horizontal mold movement part is configured to shift the mold in a horizontal positional direction such that a position onto which the molten effluent drops varies; a mold supporting part, which supports the molten solidified body mold from the lower part of the molten solidified body mold; and
   a vertical mold movement part comprising a Z axis movement part, wherein:
      the Z axis movement part is configured to, when the molten effluent is discharged, shift the mold in a vertical positional direction such that a height of the mold relative to the lower part of the melt discharge outlet varies, and
      the mold is configured to adjust the position onto which the molten effluent drops such that the position is located at a height lower than a height of a previously-discharged molten effluent.

2. The mold supporting device of claim 1, further comprising a rotational movement part that rotates the molten solidified body mold.

3. The mold supporting device of claim 1, comprising a mold movement control part that controls the movement of the horizontal mold movement part such that a height of the molten effluent from the melting furnace becomes uniform.

4. The mold supporting device of claim 1, wherein the mold supporting device is configured to use at least one of the horizontal mold movement part and the vertical mold movement part to effect at least one of the horizontal position shift of the mold and the vertical position shift of the mold such that a movement route of the discharging of the molten effluent does not result in deposition of the effluent on a highest point of the previously-discharged molten effluent.

5. The mold supporting device of claim 3, wherein the mold supporting device is configured to measure the height of the previously-discharged molten effluent to control the movement of the horizontal mold movement part.

6. The mold supporting device of claim 5, wherein the mold supporting device is configured to measure the height at a number of measurement positions of the previously-discharged molten effluent, wherein the number of measurement positions is at least two.

7. The mold supporting device of claim 6, wherein the mold supporting device is configured to cause the mold to drop the molten effluent onto a lowest position of the measurement positions.

8. The mold supporting device of claim 6, wherein the mold supporting device is configured to implement a movement route of the mold to avoid a highest position of the measurement positions.

* * * * *